Nov. 28, 1961    F. H. FOREY    3,010,328
DEVICE FOR REMOTE-CONTROLLING MOVABLE MECHANICAL MEMBERS
THROUGH TRANSMISSION MEANS OF THE
REVERSIBLE MOTION TYPE
Filed April 22, 1958    3 Sheets-Sheet 1
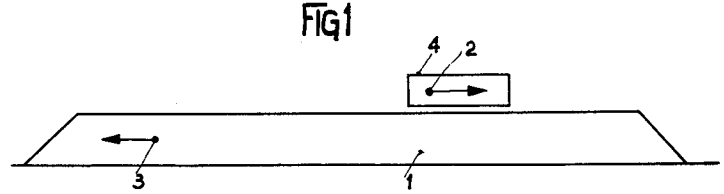
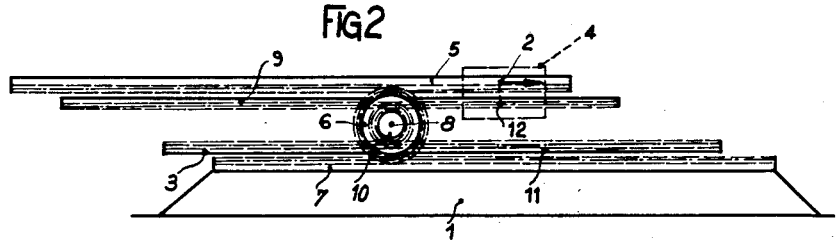
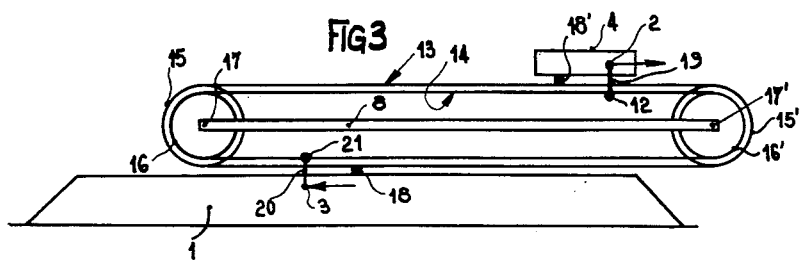

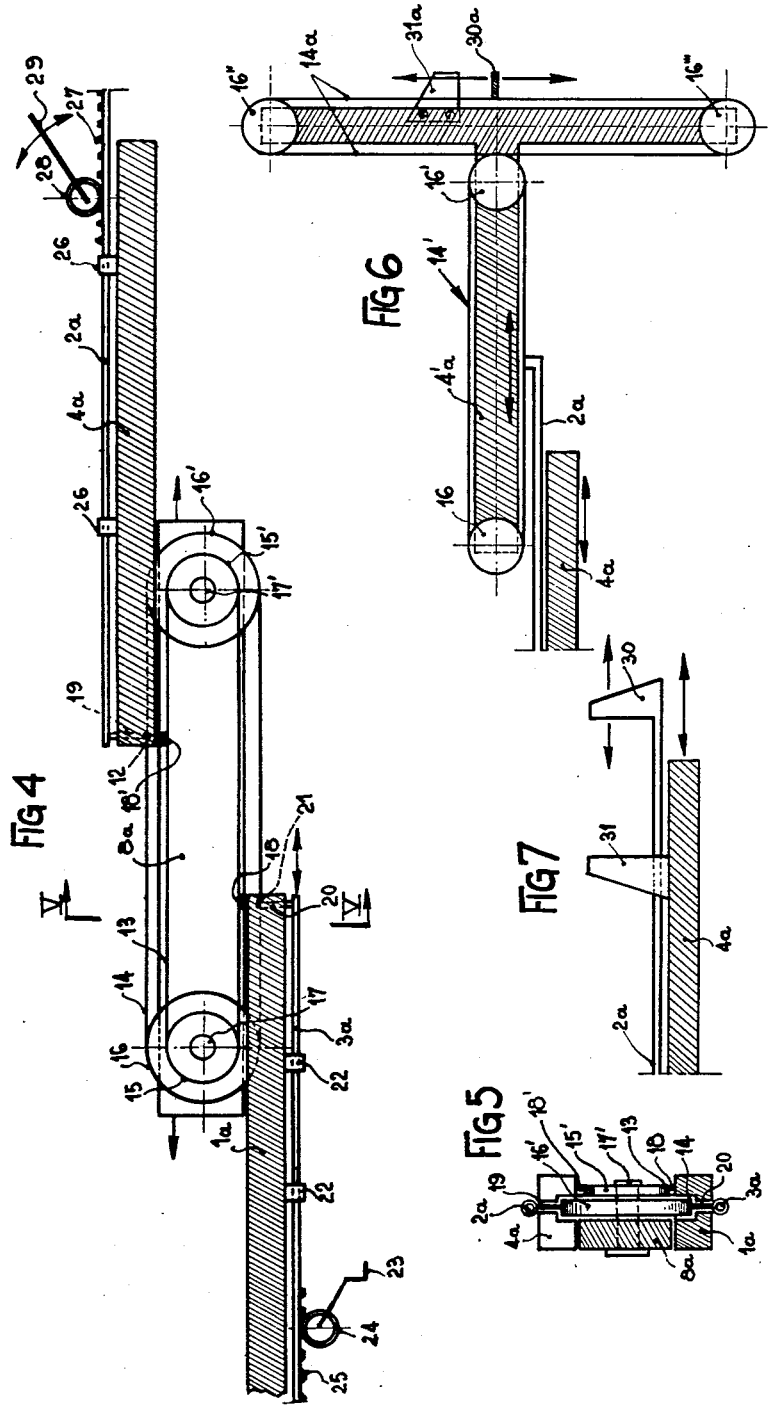

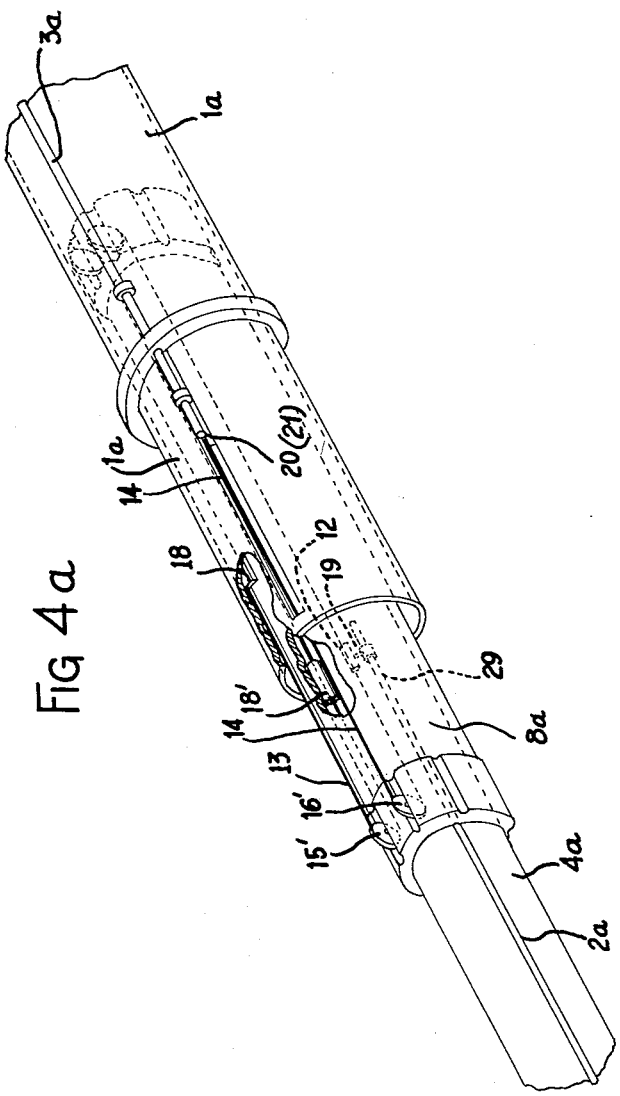

United States Patent Office 3,010,328
Patented Nov. 28, 1961

3,010,328
DEVICE FOR REMOTE-CONTROLLING MOVABLE MECHANICAL MEMBERS THROUGH TRANSMISSION MEANS OF THE REVERSIBLE MOTION TYPE
Francois Henri Forey, Paris, France, assignor to Lip Societe Anonyme d'Horlogerie, Besancon, France, a French corporation
Filed Apr. 22, 1958, Ser. No. 730,203
Claims priority, application France Feb. 18, 1958
7 Claims. (Cl. 74—110)

This invention relates essentially to a means for remote-controlling a movable element from a stationary support or structure in relation to which said element is adapted to travel.

This means is remarkable notably in that it consists in displaceably mounting said element on a support or the like, the latter being also movable, said element being connected through a first transmission of the reversible-motion type to said stationary support or structure, said first transmission being carried by an intermediate movable member the displacements of which are linked or bound through said first transmission to those of said movable support, and providing on said intermediate movable member another transmission also of the reversible-motion type connecting said movable element to a movable control member provided on said stationary support or structure, the assembly being so arranged that the movements of said movable element are controlled by imparting to said other transmission through said control member a motion relative to said first transmission.

By using these two transmissions of the reversible-motion type, carried by a common intermediate movable member the movements of which are linked or bound to those of the support carrying the movable element proper, it is possible to either impart a certain movement to said movable element or to set different positions therefor relative to its support, irrespective of the position occupied by said support relative to the stationary support or structure.

As will be made clear presently, this means of remote-controlling a movable element may be embodied in different manners, according to the nature and arrangement of the transmissions utilized; thus, these transmissions may consist of endless bands or chains carried by the intermediate movable member, or rack means, or any other means adapted on the one hand to impart to said movable intermediate member movements parallel to those accomplished by the support carrying the movable element, and on the other hand to impart a relative movement to the movable element on its support, in a direction parallel to the displacement of said last-mentioned support.

The means broadly set forth hereinabove is susceptible of very different applications; thus, notably, it may be utilized for the remote control of gripping members carried by the outer end of a movable and/or extensible arm of a handling device or equipment. Conversely, it is suitable for transferring data from the movable element to the stationary support or structure.

This invention is also concerned with a device constructed according to the means set forth hereabove for the remote-control of a movable element from a stationary support or structure in relation to which said movable element is adapted to move, said device being remarkable notably in that it comprises in combination a movable support or the like, on which said element is movably mounted, a first transmission of the reversible-motion type, carried by an intermediate movable member and connecting said stationary support or structure to said movable support, the displacements of said intermediate movable member being linked or bound through said first transmission, to those of said movable support, and another transmission also of the reversible type, carried by said movable intermediate member and connecting said movable element to a movable control member carried by said stationary support or structure, the assembly being so arranged that said control member, by imparting a relative motion to said other transmission relative to said first transmission, controls the displacements of said movable element.

The invention is also concerned with the specific application of the aforesaid means and device to the remote control of gripping or handling members carried by movable and/or extensible arms in view of effecting either the remote-controlled handling of a wide range of objects, or the transmission of remote data to a stationary support or structure from any movable element.

Other features and advantages of this invention will appear as the following description proceeds with reference to the attached drawings forming part of this specification and illustrating diagrammatically by way of example a few embodiments of the invention. In the drawings:

FIGURE 1 is a diagram illustrating the principle of the remote control action to be obtained according to this invention;

FIGURE 2 is a diagrammatical view showing a first form of embodiment of the invention;

FIGURE 3 is a similar view showing another form of embodiment of the invention;

FIGURE 4 is a fragmentary longitudinal section illustrating more in detail a device constructed according to the teachings of the invention as shown in FIGURE 3;

FIGURE 4a is a fragmentary perspective view of the device of FIGURE 4;

FIGURE 5 is a cross-section taken upon the line V—V of FIG. 4;

FIGURE 6 is a fragmentary plane view illustrating another form of embodiment of the device forming the subject-matter of this invention, and FIGURE 7 is a diagrammatical elevational view showing a modified embodiment of a detail of the arrangement of FIG. 4.

Referring firstly to FIG. 1, the arrangement illustrated diagrammatically therein comprises a stationary support or structure 1 and a movable driven element or point 2 of which it is desired to control the movements relative to, and from, said stationary support or structure. The purpose of the invention is to bind in a reversible manner the movements of a point 3 considered as a movable controlling member and associated to the structure 1 with those of the movable element or point 2, irrespective of the position or proper movement of the latter relative to the structure. This binding action is suitable, inter alia, for exerting for example control actions from the structure to the movable element 2 or transferring remote data from the movable element 2 to the structure 1.

According to this invention, the movable element 2 is displaceably mounted on a movable driving supporting means or carriage 4 connected to the stationary support or structure 1 through a first movable transmission means of the reversible-motion type which is carried by an intermediate member of which the movements are linked through this transmission to those of the movable supporting means 4.

The first transmission according to the embodiment shown in FIG. 2 consists of a first movable rack means 5 assumed to be operatively connected to the carriage or like member 4 through a pinion 6 meshing with said rack means 5, and also through a stationary rack means 7 meshing similarly with this pinion 6 and carried by the stationary support or structure 1. According to the diagrammatic illustration of FIG. 2, the axis 8 of pinion 6 materializes or represents the aforesaid intermediate member.

Moreover, further movable transmission means, consisting of further movable rack means 9 slidably mounted for example on the supporting means 4, of a pinion 10 mounted for loose rotation on, and coaxially to, the aforesaid pinion 6, and of a third movable rack means 11 slidably mounted on the stationary support or structure 1 and parallel to the other rack means 5, 7, 9. The movably rack means 9 is connected by one point 12 thereof to the movable element 2 to be controlled, whilst the controlling point or member 3 is associated with or connected to the movable rack means 11.

From the onset it is clear that by virtue of this principle the movements imparted by the pinion 6 to the intermediate member 8 are the half of those accomplished by the movable supporting means 4 of the movable element 2 to be controlled. On the other hand, a relative movement of the rack means 11 (or of the associated control member 3) relative to the stationary rack means 7, on the stationary support or structure 1 is transmitted through the pinion and link 12 to the movable element 2 to be controlled. This transmission of motion takes place with equality of forces and movements which remain independent of the position of the carriage 4.

In the modified embodiment illustrated in FIG. 3, the two transmission means of the preceding case are replaced by a pair of endless band or chain means 13, 14 both carried by the intermediate movable member 8, the return pulleys or like members 15, 15′ of the endless band or chain means 13 being coaxial to the return pulleys of like members 16, 16′ of the endless band or chain means 14. These pulleys are mounted for loose rotation and by pairs on shaft means 17, 17′ carried by the intermediate member 8. The first band means 13 interconnects the movable carriage 4 and the stationary support or structure 1 through a link 18 provided between its other reach and the stationary support or structure 1, the further band means 14 connecting the movable element 2 to be controlled to the controlling point or member 3 through a link 19 provided between a point 12 of one of its reaches and the movable element 2 and another link 20 provided between a point 21 on its other reach and the control member 3.

The operation of this device is similar to that of the device illustrated in FIG. 2, the band means 13 imparting to the intermediate member 3 movements that are the half of those accomplished by the movable carriage 4, whilst the further band means 14, when a motion is imparted thereto through the controlling member 3 relative to the first band means, transmits this movement to the movable element 2 to be controlled.

The principle of the control motion just described is applicable in a particularly advantageous manner by providing telescopic tubes 1a, 8a, 4a (FIGS. 4 and 4a) interfitting as shown and constituting the stationary support, the intermediate member and the movable driving means supporting the element to be controlled, respectively. In the FIGURE 4 only one portion of a side wall of each of these tubes are shown, for the sake of clarity while in FIGURE 4a, these tubes are shown such as they are constructed presently. The intermediate tube 8a carries the two endless band means or like elements 13, 14 of which the former imparts to the intermediate tube movements that are the half of those accomplished by the movable tube 4a. The other band means or like element 14 transmits to the movable tube 4a the movements imparted to a controlling rod or like member 3a slidably mounted on the tube 1a by means of bearings or like devices 22. This rod 3a may be controlled for example by means of a crank 23 adapted for example to impart an axial movement to this rod 3a through the medium of a pinion 24 keyed on the shaft of this crank and meshing with teeth 25 formed on the rod 3a. The free end of the rod 3a is connected through the link 20 to a point 21 of the band means 14, whilst another point 12 of the same band means is connected through the link 19 to the movable element to be controlled which, in this case, consists of a rod or shank 2a slidably mounted in bearings 26 carried by the movable tube 4a.

The displacement of this other rod or shank 2a may be utilized for example for controlling various actions. Thus, according to the example illustrated in FIG. 4, this rod controls through a set of teeth or rack means 27 and a pinion 28 the angular displacements of a lever or other mechanical member 29 rotatably rigid, for example, with the shaft of pinion 28.

In the modified embodiment illustrated in FIG. 7, this rod 2a carries at its end a jaw or like member 30 having associated therewith on the movable tube 4a another jaw 31 which is stationary relative to this movable tube and constitutes in combination with the jaw 30 a clamp or like gripping device, the opening and closing movements of which are determined by the axial movements of the rod 2a.

With this arrangement it is also possible to control the transverse displacement of a movable element on the tube 4a by utilizing, for example as shown in FIG. 6, an endless band 14 passing over five pulleys or like return means 16, 16′, 16″, 16‴ (of which two are superposed at 16′) to provide two reaches 14a disposed transversely relative to the direction of movement of the movable tube 4a. One of the transverse reaches 14a of this band carries a jaw or like member 30a having associated therewith another but stationary jaw or like member 31a carried by an element or piece 4′a rigid with the tube 4a.

Of course, many other relative arrangements of parts adapted to provide different control actions may be derived from a device constructed according to the principles set forth hereinabove in view of controlling from a distance the most diversified movements of mechanical parts, gripping members, etc.

Moreover, any desired and appropriate number of transmission means of the type providing a reversible motion in view of effecting the simultaneous control of a plurality of movable elements associated with the same carriage 4 may be provided in combination with a stationary structure such as 1, an intermediate movable member such as 8 and a movable carriage such as 4. Thus, more particularly, three, four or a greater number of endless bands, chains or racks may be mounted in parallel in view of either multiplying the number of control actions obtained from the stationary support or structure, or combining these control actions with the tele-transmission of data transferred to the stationary support or structure from the controlled movable elements. Finally, if necessary, endless bands or transmission chains and racks may be combined with driving pinions in a same arrangement.

Of course, this invention should not be construed as being limited to the specific forms of embodiment shown and described herein, as these are simply illustrative examples showing the manner in which the invention may be carried out in the practice.

What I claim is:

1. A motion device comprising a stationary support, a controlling element reciprocally movably mounted on said stationary support, driving supporting means, means mounting said driving supporting means reciprocally movably relative to said stationary support, a driven element reciprocally movably mounted on said driving supporting means, an intermediate member, means mounting said intermediate member reciprocally movably relative to both said stationary support and said driving supporting means, first and second transmission members mounted on said intermediate member so as to be reversibly movable, first transmission means coupling said driving supporting means and said first transmission member on the one hand and said first transmission member and said stationary support on the other hand and adapted to produce, in response to movement of said driving supporting means, corresponding movement of said first transmission member and corresponding movement of said intermediate member relative to a fixed reference point on said stationary member, and second transmission means substantially the same as said first transmission means but coupling said driven element and said second transmission member on the one hand and said second transmission member and said controlling element on the other hand, whereby said controlling element remains stationary when said driven element moves in unison with said driving supporting means, and whereby movement of said controlling element causes movement of said driven element relative to said driving supporting means.

2. A motion device comprising a stationary support having a longitudinal axis, a controlling element reciprocally movably mounted on said stationary support, driving supporting means, means mounting said driving supporting means longitudinally reciprocally movably relative to said stationary support, a driven element reciprocally movably mounted on said driving supporting means, an intermediate member, means mounting said intermediate member longitudinally reciprocally movably relative to both said stationary support and said driving supporting means, first and second transmission members reciprocally rotatably mounted on said intermediate member and respectively having corresponding opposed reaches, first transmission means linearly coupling said driving supporting means and said first transmission member at one reach thereof on the one hand and said first transmission member at the other reach thereof and said stationary support and adapted to produce, in response to movement of said driving supporting means, corresponding rotary movement of said first transmission means and corresponding movement of said intermediate member relative to a fixed reference point on said stationary member, and second transmission means substantially the same as said first transmission means but coupling said driven element and said second transmission member at its reach corresponding to said one reach on the one hand and said second transmission member at its other reach and said controlling element on the other hand, whereby said controlling element remains stationary when said driven element moves in unison with said driving supporting means, and whereby movement of said controlling element causes movement of said driven element relative to said driving supporting means.

3. A motion device according to claim 2, said first and second transmission members respectively comprising first and second pinions, said first transmission means comprising racks respectively mounted on said driving supporting means and said stationary support and operatively engaging said first pinion, said second transmission means comprising further racks respectively mounted on said driven element and said controlling element and operatively engaging said second pinion.

4. A motion device comprising a stationary support having a longitudinal axis, a controlling element longitudinally reciprocally movably mounted on said stationary support, driving supporting means, means mounting said driving supporting means longitudinally reciprocally movably relative to said stationary support, a driven element longitudinally reciprocally movably mounted on said driving supporting means, an intermediate member, means mounting said intermediate member longitudinally reciprocally movably relative to both said stationary support and said driving supporting means, first and second transmission members reciprocally rotatably mounted on said intermediate member, each said transmission member comprising longitudinally spaced pulleys and an endless pulley belt operatively mounted on said pulleys and having opposed reaches, first means coupling said driving supporting means and the belt of said first transmission member at one reach thereof on the one hand and said first transmission member belt at the other reach thereof at said stationary support and adapted to produce, in response to movement of said driving supporting means, corresponding rotary movement of said first transmission member belt and corresponding movement of said intermediate member relative to a fixed reference point on said stationary member, means coupling said driven element and the belt of said second transmission member at its reach corresponding to said one reach on the one hand, and said second transmission member belt at its other reach and said controlling element on the other hand, whereby said controlling element remains stationary when said driven element moves in unison with said driving supporting means and whereby movement of said controlling element causes movement of said driven element relative to said driving supporting means.

5. A motion device according to claim 4, said motion device also comprising means for gripping an object and means operatively coupling said gripping means to said driven element for actuation thereof into and out of gripping condition by movement of said driven element.

6. A motion device comprising a stationary tube, a driving supporting tube, an intermediate tube, said intermediate tube being slidably mounted on one end portion of said stationary tube, said driving supporting tube being slidably mounted on the end portion of said intermediate tube which is remote from said stationary tube, a controlling element reciprocally slidably mounted on said stationary tube beyond said intermediate tube, a driven element reciprocally slidably mounted on said driving supporting tube, first and second transmission members mounted on said intermediate member and each comprising a pair of pulleys spaced in the direction of the axis of said intermediate tube and an endless belt mounted on said pulleys, said belt having opposed reaches, means coupling said driving supporting tube and the belt of said first transmission member at one reach thereof on the one hand and said belt of said first transmission member at the other reach thereof at said stationary tube and adapted to produce, in response to movement of said driving supporting tube, corresponding rotary movement of said belt of said first transmission means and corresponding movement of said intermediate tube relative to a fixed reference point on said stationary tube, and means coupling said driven element and the belt of said second transmission member at its reach corresponding to said one reach on the one hand and said belt of said second transmission member at its other reach and said controlling element on the other hand, whereby said controlling element remains stationary when said driven element moves in unison with said driving supporting tube, and whereby movement of said controlling element causes movement of said driven element relative to said driving supporting tube.

7. A motion device according to claim 6, said driven element and said controlling element respectively being in the form of axially extending rods.

References Cited in the file of this patent

UNITED STATES PATENTS

| | | |
|---|---|---|
| 399,313 | Bradford | Mar. 12, 1889 |
| 1,343,008 | Sauvage | June 8, 1920 |
| 2,732,723 | Crofton | Jan. 31, 1956 |
| 2,766,630 | Ehrler | Oct. 16, 1956 |
| 2,842,972 | Houdart | July 15, 1958 |
| 2,914,955 | Colborne et al. | Dec. 1, 1959 |